M. A. FOUNTAIN.
REVERSE LINK.
APPLICATION FILED OCT. 16, 1907.
937,677.
Patented Oct. 19, 1909.
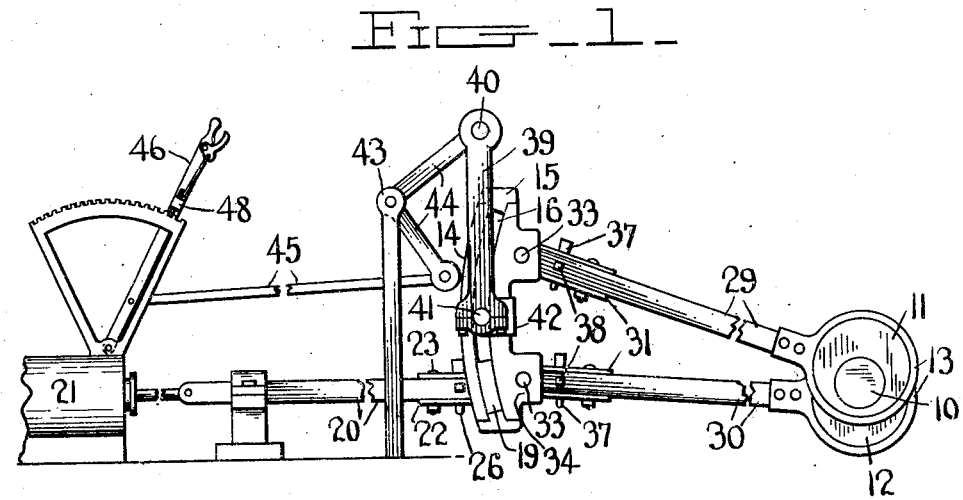
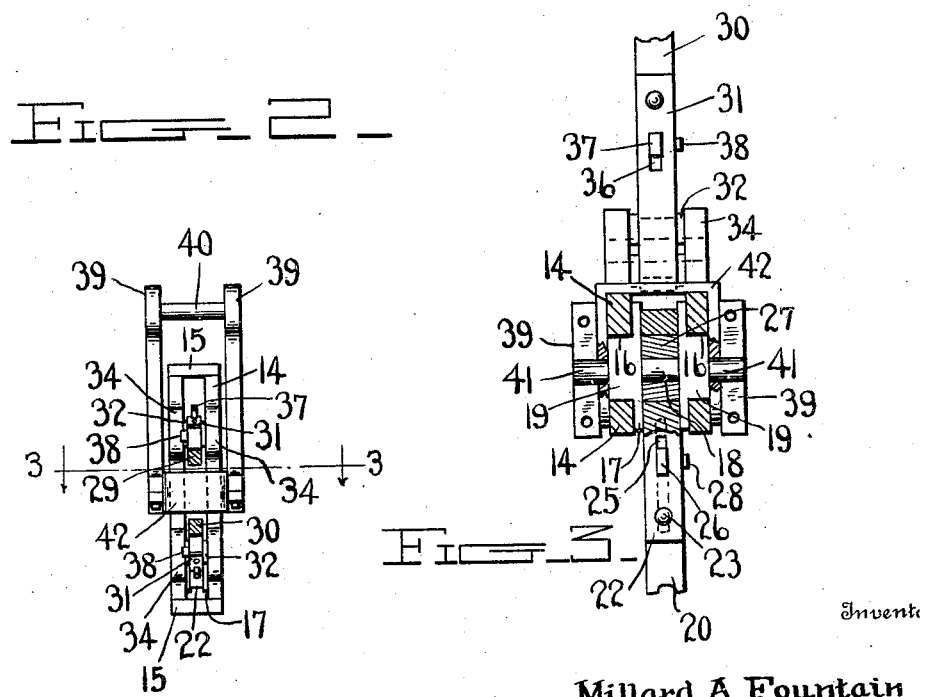
Witnesses
L. B. James
Inventor
Millard A. Fountain
By
Attorney

UNITED STATES PATENT OFFICE.

MILLARD A. FOUNTAIN, OF BLOOMFIELD, IOWA.

REVERSE-LINK.

937,677.  Specification of Letters Patent.  Patented Oct. 19, 1909.

Application filed October 16, 1907.  Serial No. 397,748.

*To all whom it may concern:*

Be it known that I, MILLARD A. FOUNTAIN, a citizen of the United States, residing at Bloomfield, in the county of Davis, State of Iowa, have invented certain new and useful Improvements in Reverse-Links; and I do hereby declare the following to be a full, clear, and exact description of the invention, such as will enable others skilled in the art to which it appertains to make and use the same.

This invention relates to links for locomotives and other engines and has for its primary object to simplify the construction of such links as well as to provide a novel combination of link and means for shifting the same.

The novelty in the invention resides, principally, in the form of link and in the means for suspending the same.

In the accompanying drawings, Figure 1 is a side elevation of a valve motion provided with a link constructed in accordance with this invention. Fig. 2 is a front elevation of the link and its related parts. Fig. 3 is a detailed sectional view on the line 3—3 of Fig. 2, certain parts being broken away the better to show the arrangement.

In the drawings 10 indicates the main driving shaft and 11 and 12 eccentrics thereon there being the usual straps 13 fastened around the said eccentrics.

The link motion proper embodies a skeleton link which is made up of arcuate side pieces 14 which are connected in spaced parallel relation by means of upper and lower connecting portions 15. The side pieces 14 of the skeleton link are provided with arcuate slots 16 the function of which will be presently fully explained. The link block of the mechanism comprises a pair of cheek pieces 17 which are connected in spaced relation by means of an integral saddle pin 18. Each of these cheek pieces is formed with an integral arcuate rib 19 and the ribs of the two cheek pieces work in the slots 16 in the side members 14 of the skeleton link, it being understood that the cheek pieces 17 work between the said side pieces 14 of the skeleton link.

The numeral 20 indicates the valve rod of the engine and this valve rod is connected to a valve stem which passes into the steam chest of the engine which steam chest is indicated by the numerals 21.

The saddle pin and rod 20 are connected by means of the usual strap 22 which is held to the rod by a bolt 23 passing through the ordinary slot. The strap is also provided with the usual slot 25 and key 26 for holding the same in adjusted position. Brasses 27 are also used for taking up the wear. A set screw 28 is used for the purpose of holding the key in adjusted position.

Connected to the eccentric straps 13 are the ends of eccentric rods 29 and 30. These rods are also connected to the links by means of straps 31 and brasses 32. These brasses 32 receive pins 33 which are seated at their ends in spaced ears 34, the said ears being formed upon the rear edges of the side members 14 of the skeleton link. The rods are slotted as at 35 and 36 and are provided with the usual bolts, tapered keys 37, and set screws 38.

The hanger for the skeleton link will now be described. The said hanger comprises a pair of spaced members 39 which are connected at their upper ends by means of a cross pin 40 and at their lower ends are loosely connected with trunnions 41 which project laterally from the spaced portions of a yoke 42, the said yoke being so proportioned as to fit upon the skeleton link with its spaced portions lying against the side members 14 thereof and its connecting portion extending across the corresponding edges of the said side members. This yoke is bolted or otherwise secured to the skeleton link.

Hung in any suitable manner as at 43 is an angle lever 44 from one arm of which the link hanger is suspended, the said arm being loosely connected at its end with the cross pin 40. To the other arm of the angle lever 44 is connected one end of a connecting rod 45 and this rod is connected at its opposite end to a lever 46 which is mounted for rocking movement in a segment frame 47 and includes the usual hand operated pawl mechanism 48 for coöperation with the arcuate element of the said segment frame.

From the foregoing description of my invention it will be readily understood that by rocking the lever 46, the link hanger may be raised or lowered together with the link which is supported thereby and in view of the fact that the valve rod at all times maintains a position in the same plane, the upper or lower end of the link will rock to a greater degree according as to whether it is shifted upwardly or downwardly. This shifting of the link will of course result in a shorter or longer reciprocatory movement of the valve rod and it will be understood, of course, that when the link is so shifted that the valve rod is in a direct line with the center of the link or rather at a point equidistant from its ends, the valve rod will have no motion whatsoever. It will further be understood that by shifting the link from a point above or below this last mentioned position to a point below or above the said position, the engine will be reversed.

What is claimed, is—

1. In a link motion, a link comprising four arcuate bars, end connections for said bars, a yoke engaging the bars of said link between the ends to brace the bars together, and pins formed on said yoke.

2. In a link motion, a link comprising four arcuate bars, end connections for said bars, a yoke engaging the bars of said link between the ends to brace the bars together, and pins formed on said yoke for the attachment of a suspending yoke, and means on the link adjacent the end thereof for the attachment of the eccentric rod.

3. In a link motion, a link comprising four arcuate bars, end connections for said bars, a yoke engaging the bars of said link between the ends to brace the bars together, and pins formed on said yoke for the attachment of a suspending yoke, and means on the link adjacent the end thereof for the attachment of the eccentric rod.

In testimony whereof, I affix my signature, in presence of two witnesses.

MILLARD A. FOUNTAIN.

Witnesses:
   A. J. FOUNTAIN,
   S. J. ANDREW.